United States Patent
Betz et al.

(10) Patent No.: US 9,213,760 B2
(45) Date of Patent: Dec. 15, 2015

(54) UNIFIED SOCIAL CONTENT PLATFORM

(71) Applicant: LinkedIn Corporation, Mountain View, CA (US)

(72) Inventors: Joseph Paul Betz, Mountain View, CA (US); Brian Guarraci, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 27 days.

(21) Appl. No.: 13/686,127

(22) Filed: Nov. 27, 2012

(65) Prior Publication Data

US 2014/0149448 A1 May 29, 2014

(51) Int. Cl.
*G06F 17/30* (2006.01)

(52) U.S. Cl.
CPC .... *G06F 17/30702* (2013.01); *G06F 17/30707* (2013.01); *G06F 17/30867* (2013.01)

(58) Field of Classification Search
CPC ............. G06F 17/30312; G06F 17/30321
See application file for complete search history.

(56) References Cited

U.S. PATENT DOCUMENTS

| 2009/0177744 | A1* | 7/2009 | Marlow et al. ................ 709/204 |
| 2010/0199184 | A1* | 8/2010 | Horowitz et al. ............. 715/733 |
| 2010/0268728 | A1* | 10/2010 | Tadlock et al. ............... 707/769 |
| 2012/0158715 | A1* | 6/2012 | Maghoul et al. ............. 707/728 |
| 2013/0073280 | A1* | 3/2013 | O'Neil et al. ..................... 704/9 |
| 2013/0347078 | A1* | 12/2013 | Agarwal et al. ................... 726/4 |
| 2014/0149856 | A1 | 5/2014 | Fong et al. |

OTHER PUBLICATIONS

"U.S. Appl. No. 13/688,054, Non Final Office Action mailed Feb. 12, 2015", 12 pgs.

* cited by examiner

*Primary Examiner* — Khanh Pham
(74) *Attorney, Agent, or Firm* — Schwegman Lundberg & Woessner, P.A.

(57) ABSTRACT

A system can optionally include a social network database configured to store social network information records related to a user of the social network, wherein the social network database is configured to classify an individual information record according to the user of the social network and at least one of an application that generated the individual information record and an object of the individual information record. The system can further include a processor configured to identify ones of the information records as classified in the social network database based on at least one of the user and the at least one of the application and the object and transmit data indicative of a common characteristic of the ones of the information records to the social network.

20 Claims, 7 Drawing Sheets

UNIFIED SOCIAL CONTENT PLATFORM

TECHNICAL FIELD

The subject matter disclosed herein generally relates to unified social content platform.

BACKGROUND

Contemporary social networks can conventionally allow users of the social network to upload personal data and other information to the social network and establish relationships with other users of the social network. Such data, information, and relationships can be utilized by the users and by the social network infrastructure to create and convey postings on the social network informing the social network users of information and activities of the various users of the social network. The source of such postings can derive from the direct input of a user, such as by posting a self-crafted message for viewing by other users of the social network. In addition, the social network infrastructure itself can create postings, such as to update users as to new relationships between users, user career changes, and so forth.

BRIEF DESCRIPTION OF THE DRAWINGS

Some embodiments are illustrated by way of example and not limitation in the figures of the accompanying drawings.

DETAILED DESCRIPTION

Example methods and systems are directed to a unified social content platform. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Certain social networks may utilize disparate systems for creating postings for display on the social network. As an example, one system may generate postings relating to a change in employment status for users while a second system may generate postings related to user activities. Consequently, such a social network may either have various postings that have inconsistent formats or wording or may create difficulties or inefficiencies in providing for the generation of consistent postings; because a change in formatting may involve proceeding into every separate system to change the format, such changes may be time consuming and subject to error.

In addition, because separate systems may incorporate disparate data management methodologies, the storage of social network information that may be utilized to create postings may be similarly fragmented. For instance, data on a user activity may be stored in a way that is accessible through searching first for the user and then the activity, rather than, for instance, searching for the activity directly. As a result, an attempted search for related activities, without respect to the users conducting the activities, may be inefficient, difficult, or impossible in such a social network. Consequently, searches that cross the bounds of the individual systems that make up a social network may omit useful information or be limited in scope.

A unified social content platform has been created that can incorporate common publication and data retrieval across the social network. The unified platform can provide a template for the display of some or all social network-generated information. The unified platform can be utilized to create changes in the display format that can be automatically and quickly or essentially instantly applied throughout the social network by changing the format in the unified platform. In addition, data stored by the social network can be associated with respect to other data according to various standards, permitting, for instance, detailed searches that can be based not on how the data was obtained but according to the nature of the data itself. Thus, a user activity can be searched for according to the user who engaged in the activity or according to related activities or other factors.

Within the context of a social network disclosed herein, content can be defined as relatively complex, domain-specific media that can utilize server resources to be created and maintained. An activity, in contrast, can describe an event, such as when content is created, shared, or otherwise interacted with on the social network. An activity can include a summary of content and a link to the content.

Figure 1:
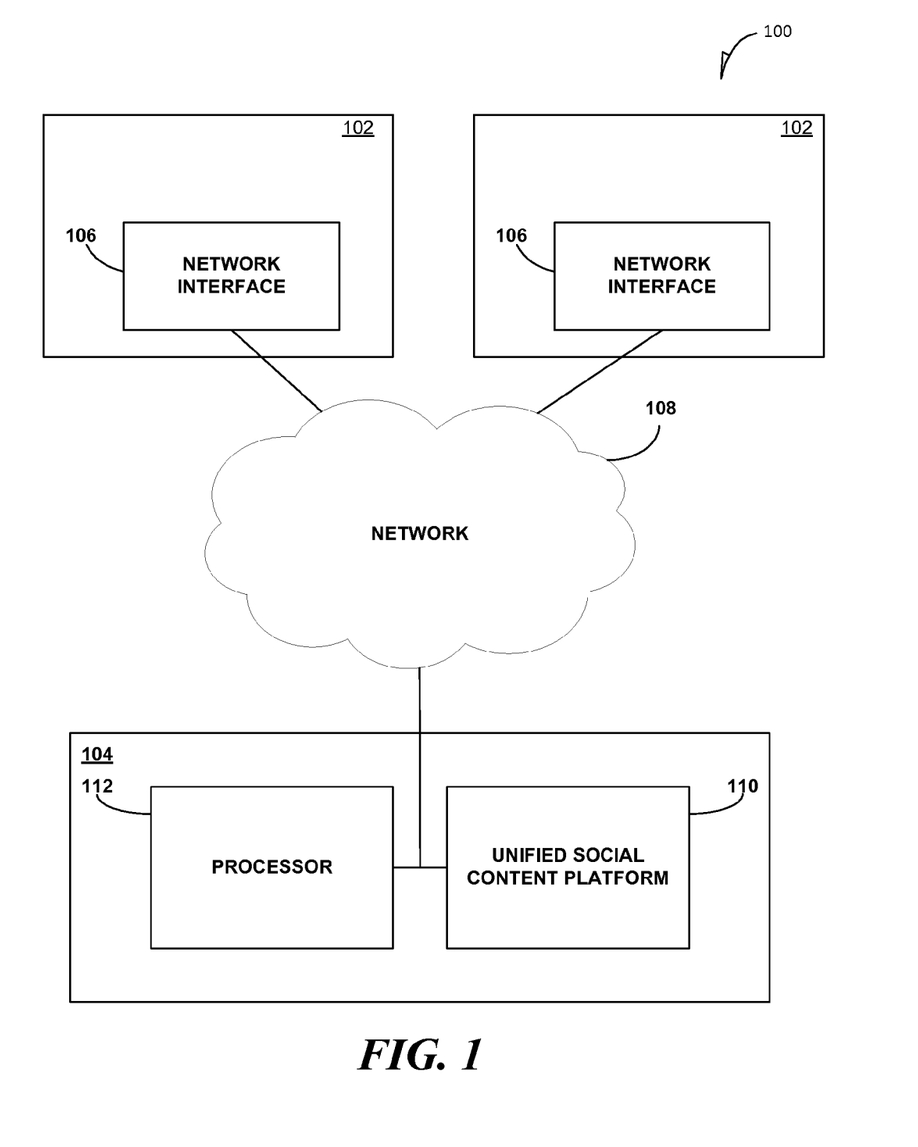
FIG. 1 is a block diagram of a system including user devices and a social network server.

FIG. 1 is a block diagram of a system 100 including user devices 102 and a social network server 104. User devices 102 can be a personal computer, netbook, electronic notebook, smartphone, or any electronic device known in the art that is configured to display web pages. The user devices 102 can include a network interface 106 that is communicatively coupled to a network 108, such as the Internet.

The social network server 104 can be communicatively coupled to the network 108. The server 104 can be an individual server or a cluster of servers, and can be configured to perform activities related to serving the social network, such as storing social network information, processing social network information according to scripts and software applications, transmitting information to present social network information to users of the social network, and receive information from users of the social network. The server 104 can include one or more electronic data storage devices, such as a hard drive, and can include a processor. The social network server 104 can store information related to members of the social network. For instance, for an individual person, the member's information can include name, age, gender, profession, location, activities, likes and dislikes, and so forth. For an organization, such as a company, the information can include name, offered products for sale, available job postings, organizational interests, forthcoming activities, and the like.

The server 104 includes a unified social content platform 110. The unified social content platform 110 can include or be provisioned by the processor and electronic storage devices of the server 104. The unified social content platform 110 can store and access social network information on the electronic storage devices, can reside on the electronic storage devices, and can utilize or be provided by the processor.

Figure 2:
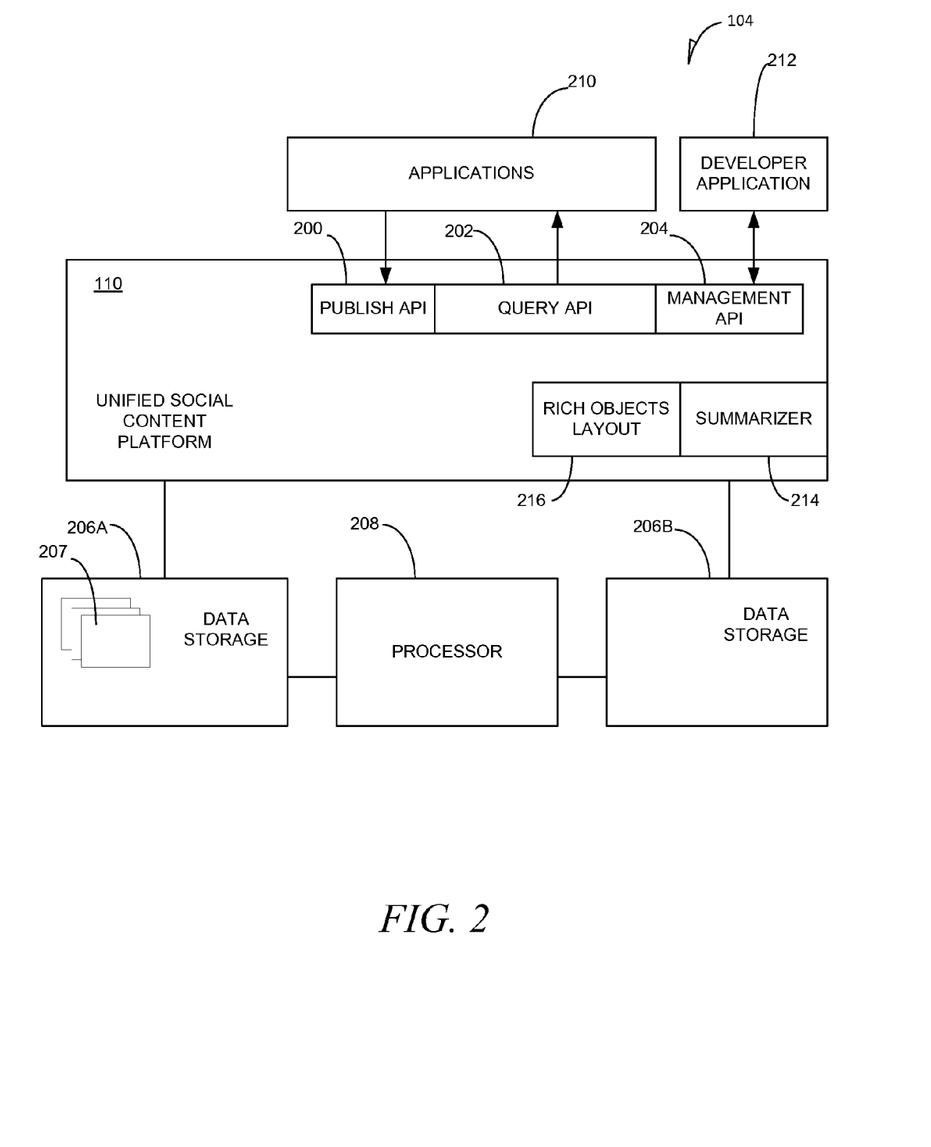
FIG. 2 is a block diagram of a server.

FIG. 2 is a block diagram of the server 104. The server includes the unified social content platform 110. In the illustrated example, the unified social content platform 110 includes a publish application programming interface (API) 200, a query API 202, and a management API 204. In the illustrated example, the electronic data storage 206 of the server 104 provides storage for the unified social content platform 110, such as can store individual information records 207, but is not itself part of the unified social content platform 110. In the illustrated example, the processor 208 of the server 104 provides processing for provisioning data provided by the unified social content platform 110 but is not itself part of the unified social content platform 110. In alternative examples, the electronic data storage 206 and the processor 208 are components, in whole or in part, of the uniform social content platform 110.

In various examples, the electronic data storage 206 can be or can include an information record 207 data storage 206A and an electronic data index 206B. The information record data storage 206A can be a durable storage of data files, including information records 207, either for long term storage for dormant files or for files actively utilized by the unified social content platform 110. In various examples, the electronic data index 206B can be utilized for searching functions, such as to identify files, such as information records 207, without necessarily accessing the files during the search. In various examples, the electronic data index 206B is non-durable data storage, in that the index merely includes information relating to files rather than the files themselves.

In the illustrated example, the server 104 includes social network applications 210, such as can interface with, provide, and obtain social network information from the user devices 102 and other sources. The server 104 further includes a developer application 212 configured to allow administrators or developers of the social network to register new criteria for the unified social content platform 110 to provide information on the social network, as disclosed herein. The developer application 212 can include or access a user interface and can access the management API 204. The developer application 212 can allow a developer to create custom social network applications while also adhering to a substantially uniform aesthetic and front end rendering. The uniform social content platform 110 can publish developed applications to the social network substantially immediately.

The unified social content platform 110 can include a data model that includes standard fields that can be applied across social network application and activities. The data model can include standard fields such as a destination and a visibility of an application. The data model can further include a data field for user defined fields, such as can be provided by a developer via the developer application 212 or by a user of the social network.

The publishing API 200 can be called by an application to publish activity to the unified social content platform 110. Published applications 210 can be queried by at least the unified social content platform 110 and identified to a user, such as via the developer application 212. Upon being published, the applications can also be sent to a pipeline to be provisioned to the user devices 102 via the social network.

The processor 208 can manage the pipeline, such as with dedicated pipeline software. The processor 208 can attach data onto activity items that are provided, such as by applications 210, to the user devices 102 via the social network. Such data can include summaries of users, such as users acting on the applications 210, and objects in an activity. In an example, if the actor is a member of the social network then the actor's name, profile picture or profile picture uniform resource locator (URL), and/or other data regarding the member of the social network. In an example, if the object of the action is a webpage, a summary of the web page can be attached. The processor 208 can also be configured, such as within its pipelining functionality, to store an activity, such as in the form of an information record 207, to a long term electronic storage 206A, provide a search term to a search index in electronic storage 206B, tally an activity index count, and send an event notification to offline storage.

The unified social content platform 110 can further include a summarizer module 214. The summarizer module 214 can identify a body of an activity item. The body can include a subject, verb, and/or object of the activity item. The body can be provided for searching of activities, with the body providing certain commonly-sought data points for typical searches. The summarizer module 214 can be included in a language-translated or translatable format for searching in various languages. The summarizer module 214 can annotate the body with the location of entities so that the entities can be highlighted and/or hyperlinked by a renderer. Annotations can identify the text that is annotated by start and end offset indices.

The body of the activity items generated by the unified social content platform 110 can be common among all applications. The user devices 102 can be configured to render activities transmitted from the unified social content platform 110 without having to be separately configured for different applications. The content summary can accompany the body in an activity. The body and the content summary can be utilized to create consistent content displays and developer applications. The body can be annotated with semantic regions, allowing users and developers to tailor the display of bodies based on the context. In an example, if a particular company is mentioned in a body, the annotation can indicate to a user device 102 to generate and/or display a profile of the company.

The summarizer module 214 can, in certain examples, create a body for display, such as upon having identified the body. The summarizer module 214 can decorate an activity view, such as on a user device 102, with locale-dependent views of entities, such as members, companies, and so forth. The summarizer module 214 can render a template according to context and dedicated helper functions. Upon rendering, a fully formed body string can be displayed within a display region to show the body.

The unified social content platform 110 can optionally include additional APIs or templates for certain dedicated tasks. The unified social content platform 110 can include a query template for regularizing queries of stored materials. In an example, the unified social content platform 110 can include rendering templates that can be used in cross-platform applications. Such cross-platform applications can include as aspects of the social network that is not necessarily provided by the unified social content platform 110. The rendering templates can be built and registered via the developer application 212. Applications may select between and among the rendering templates for use with activity items.

In an example, the social content platform 110 includes a comment API to append comments to activities or other material managed by the unified social content platform 110. The comment API can optionally create discussion threads upon the establishment of a comment. Comments can be aggregated with other activity data, such as social gestures such as indications that a user likes an activity or content.

The processor 208 can provision a pipeline to transmit applications generated by the unified social content platform 110 to the social network generally, such as to be displayed on a user device 102. The pipelining process can utilize a rich objects layout block 216 to convert conventional text into presentational layouts that include graphics, stylized text, and so forth. The rich objects layout block 216 can be provided by the processor 208 or can be provided by dedicated resources, such as processors and electronic memory. The pipeline provided by the processor 208 can further provide storage and indexing of applications, in various examples with or without rich object layouts. The pipeline can be accessible to other applications being generated in the unified social content platform 110 and, in various examples, elsewhere in the system 100, allowing applications in the pipeline to be utilized for other development purposes. The system 100 generally, and in various examples the unified social content platform 110 specifically, can incorporate pipeline monitoring functionality to identify applications in the pipeline, such as by according to a unique identifier.

The unified social content platform 110 can include data on members of the social network, the social graph of the members of the social network, and content summaries of applications. The social graph data may be remote to the server 104 or to the social network generally, such as by incorporating distributed social graph information from multiple sources outside of the social network. Such distributed social graph information can be accessed as part of a query execution. These data can include dependent data. In an example, the member data can include fields indicating: member activity; a member age bracket; whether member connections are allowed; whether an open link is allowed by the member; member group information; member connections; member country; a date the member registered with the social network; a default locale; a member profile viewer; a member web profile; various member group exclusions; a member name; a member gender; a member social generation; a member time zone or time zone offset; a member job industry; a identification of an inviter of the member to the social network; a time the member last checked the social network; a last time the member logged in to the social network; a member name preference; a member geographic location; a member unique identifier; a member picture; a member email address; a member status; a member postal code; a preferred member locale; a number of social network proposals accepted by the member; a member region; whether the member requires or required referral to the social network or functions of the social network; member restrictions; a member state; a member social network subscription plan; a member vanity name; a web profile setting, and a member age.

In various examples, the unified social content platform 110 can be wholly or substantially self-contained/sufficient. In various examples, the unified social content platform 110 does not make "sideways" calls to another equivalently-tiered block. Rather, like certain super blocks known in the art, the unified social content platform 110 can, in certain examples, make calls "down" to general infrastructure blocks. Such infrastructure blocks can include the electronic data storage 206, certain functions that may be provided by the processor 208, such as the pipelining function. "Cloud" computing functions known in the art can be included as infrastructure.

In various examples, equivalent mid-tier calls can be made by the unified social content platform 110 to other mid-tier or super blocks. In an example, another block can provide proxy calls to the unified social content platform 110. In such an example, various services can provide data to decorate onto the result of the proxy call. Alternatively, the unified social content platform 110 can monitor streaming data from mid-tier or super blocks and maintain read-only replicas of data from the other mid-tier or super blocks.

The unified social content platform 110 can be published with extension points or service provider interfaces (SPI). The unified social content platform 110 can be published as a raw schema and/or as a dedicated client library with an SPI including interfaces that can be implemented to the unified social content platform 110 as well as to the schemas to, for instance, permit the addition of processing elements to the processor 208. The APIs and SPIs of the system 100 generally can be built as independent tasks.

Figure 3:
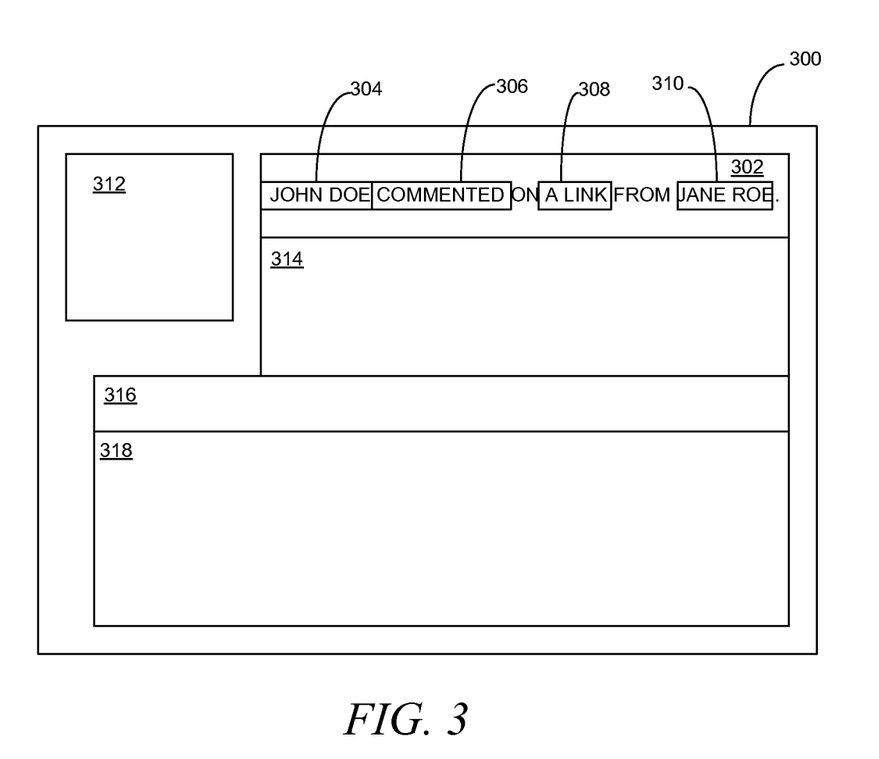
FIG. 3 is a block diagram of a user interface screen displaying an activity provided by a uniform social content platform.

FIG. 3 is a block diagram of a user interface screen 300 displaying an activity provided by the uniform social content platform 110. The user interface screen 300 can be provided on the client devices 102 to the extent that a user account on the social network that corresponds to the activity in question is accessed on the client device 102. In an example, the screen 300 can display an activity statement according to an actor-verb-object format disclosed herein. In alternative examples, different formatting selections can be generated via the unified social content platform 110.

The screen includes a body 302 of an activity as generated by the summarizer module 214. The illustrative example body 302 includes an actor field 304, a verb field 306, an object field 308, and an attributed entity field 310. The unified social content platform 110 can include text to link together the body fields 304, 306, 308, 310 into a grammatically coherent way. The linking text can be included by a developer, such as via the developer application 212 in the development of the pertinent application, or according to an engine of the unified social content platform 110 that can generate appropriate and substantially grammatically correct phrases.

The body 302 can be generated based on an information record 207. The information record can include various information from activities and other occurrences within or in relation to the social network, including information that can be utilized to populate the individual body fields 304, 306, 308, 310. The information records 207 can be stored only with the discrete information for the body fields 304, 306, 308, 310, or can include a wider range of information that can be parsed to arrive at the information for the individual body fields 304, 306, 308, 310. In an example, the body 302 itself can be an information record.

The body 302 can be organized and presented according to rendering templates, as noted above. Such templates can be predefined within the unified social content platform 110 and, in certain examples, may be required for use by all applications. In various non-limiting examples, the rendering templates can include: singular actor, past tense verb, object; singular actor, past tense verb, activity; singular actor, past tense verb; two actors, past tense verb, object; two actors, past tense verb, activity; three person actors, past tense verb, object; three non-person actors, past tense verb, object; three person actors, past tense verb, activity; three non-person actors, past tense verb, activity; actor, past tense verb, two objects; actor, past tense verb, three objects; and additional combinations and permutations consistent with the rendering of text.

In various examples, the rendering templates can be utilized in rendering the body 302 in multiple languages. In an example, the rendering templates are in English. Upon the selection and population of the English rendering template with the body fields 304, 306, 308, 310, as appropriate to the rendering template, the body 302 is then translated from English to the desired language. In various examples, an available automated translation program is utilized or the body 302 is manually translated by a human operator.

Alternatively, rendering templates can be created in multiple languages and utilized to create the body 302 in those languages utilizing the body fields 304, 306, 308, 310 as input. In such examples, the templates are stored in multiple languages and the appropriate language template selected for rendering the body 302 in a given language. The body fields 304, 306, 308, 310 can be separately translated as appropriate for inclusion in the rendering template in the particular language. Certain rendering templates may not have a one-to-one relationship between languages due to potential formatting and language-rule variations between languages; a concept that may be applied with a single template in one language may require two or more templates in a second language due to differing grammatical rules.

The actor can be an entity that initiated the activity that is the current subject of the screen 300. The actor can be a person or a company, or any entity that can be identified. The verb can be a complex type registered with an application 210. Registration can be based on a user selection via the developer application 212 and can be changed dynamically. Conjugation can be specified by the developer when the verb is registered. A registered verb may also define custom properties by specifying each property's name and type. When a developer publishes an activity, the publisher can spicy the verb and provide values for various properties. Development comments can be appended to verbs in various examples.

The object is an entity acted upon by an activity statement. The object can be an entity that has an identifier. The object can be an entity identified by a URL. The object can be an entity that can be summarized with a title and variously an image 312, a description 314, and a URL 316 from a publisher of the object. In various examples, a social summary 318 can be included to record social network actions related to the activity. In various examples, an activity can not include an object and can be referred to as a "post".

The object can take the form of a "target". The target can be utilized where the object is part of a larger class. For instance, "X applied for a job at Y" provides Y as an example of a target, where Y is a specific company.

An attributed activity or application can be the originator of the activity. The attributed activity can be provided where the actor of the activity is not the entity that originated the activity. In an exemplary format, "X shared a link from Y" where X and Y are both actors provides an attributed activity.

Standard and custom actions can be available for an activity. Additional actions may be provided by a publisher or developer once the action is registered with the developer application 212. In query results, standard and custom actions can be attached to pertinent activities, and in an example to each pertinent activity, for rendering.

Custom properties may be defined for verbs and objects. Once defined, can activity can be published with the properties. On output, comments and counts of other social actions can be attached to each activity to facilitate rendering the comments and counts can be render inline with the activities. Similar activities can be grouped into common families according to a selectable data field of the activity Annotations can allow semantic regions of text to be marked up upon displaying an activity.

Verbs, objects, and other data types disclosed herein can be customized. Data types can be primitive or complex according to their number of customizable properties. Properties can be utilized to specify data type layout on the screen 300, such as according to syntax and appearance. The develop application 212 can be utilized to customize such properties. The properties can be selectable and customizable according to standard protocols known in the art or according to proprietary protocols.

Figure 4:
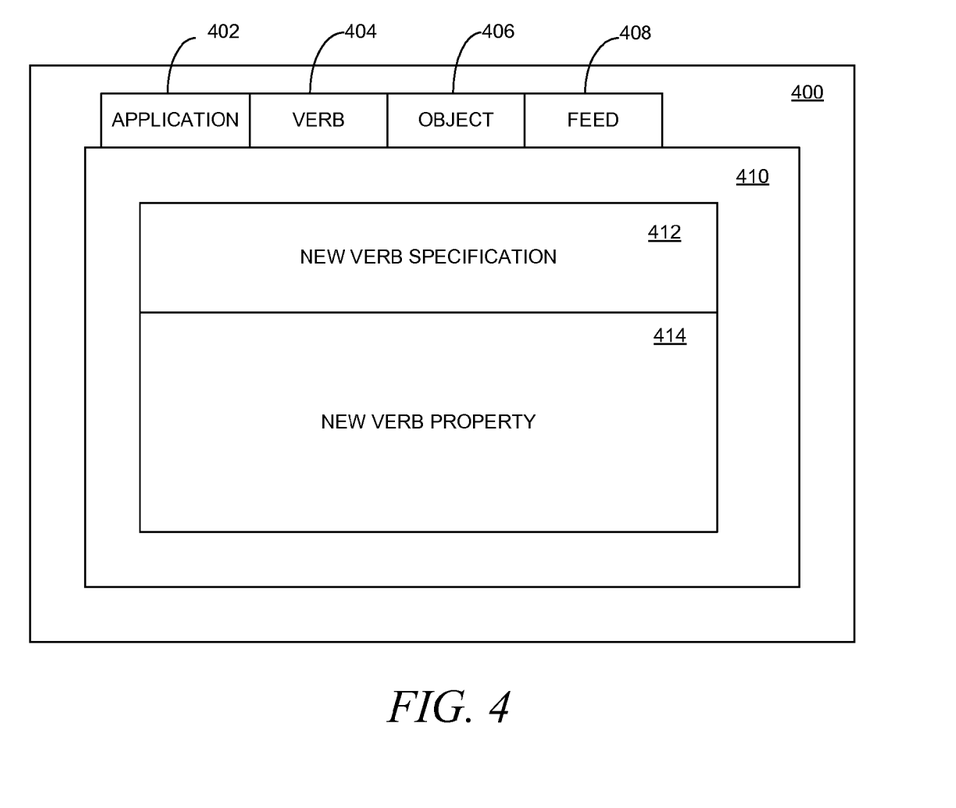
FIG. 4 is a block diagram of a developer application screen for a developer application.

FIG. 4 is a block diagram of a developer application screen 400 for the developer application 212. The user interface screen 400 can be displayed on a conventional display screen such as be a component of or interface with the server 104. The screen 400 can be utilized by a developer to register verbs, objects, custom properties, and the like.

The developer application screen 400 includes menu tabs to select various functions of the developer application 212. The tabs can include an application creation tab 402, a verb creation tab 404, an object creation tab 406, and a feed creation tab 408. Various tabs 402, 404, 406, 408 can be excluded dependent on operational needs, while additional tabs can be included as needed or as may be convenient. The tabs 402, 404, 406, 408 can be supplemented by or replaced with other conventional menu selections known in the art.

The tabs 402, 404, 406, 408 or other menu options can provide access to corresponding frames, as illustrated a verb creation frame 410 corresponding to the verb creation tab 404. The verb creation frame 410 provides new verb specification field 412 for the specification of the verb, conjugations of the verb, and similar information, and new verb property fields 414, such as can specify activities and applications to which the verb applies. Similar fields 412, 414 for specifying objects and the like can be available on frames corresponding to other tabs 402, 406, 408.

An application creation frame accessible by the application creation tab 402 can include fields to specify a name, a namespace and a description of the application. Each application can be specified a unique identifier. The application creation frame can further include fields for application attribution to specify how an attribution is displayed in an activity body, such as where in a sentence the attribution is displayed (e.g., "X commented on Y via Z"). Application attribution can be located in a separate frame or be accessible by a separate tab.

The verb creation frame 410 can include fields 412 for an un-conjugated form of the verb, conjugated forms of the verb, and fields 414 for custom properties of the verb. The developer application 212 can provide estimated conjugations of the the un-conjugated in the conjugated verb fields that can be subject to editing via the fields 412. The verb creation frame 410 can display an example activity that includes the verb.

An object type creation frame accessible by the object creation tab 406 can provide fields for entering the type of an object, such as a branch, a grammatical article (e.g., "a" or "an") that may, in certain examples, be an estimated article by the developer application 212, and fields to specify a singular and a plural form of the object. Additional fields may provide for the specification of custom properties of the object. Optional templates may be presented and selected for use with the object, as well as a preview of an example activity using the object.

The object type creation frame can further include fields specifying how to treat an object that appears as a target, such as what prepositions to use with respect to the object as a target. In various examples, objects can be referred to by type, such as a general classification of the object, rather than by the object itself. By way of comparison, an "orange" can be specified to be referred to as an "orange" or as a "fruit".

The query type creation frame can be utilized for the creation of a feed, such as in a browsing query language (BQL), as well as to define attributes that are referenced in a query. A preview of the feed for the query can be rendered in the frame and/or saved for future use or application. A unique identifier can be assigned to the feed. Each feed can be assigned a URL. Accessing the URL can display the query utilized to generate the feed.

Various applications and the components of the applications can be made generally accessible to developers who have access to the developer application. Such applications can be generally available and subject to being modified by any developer, such as by locking the application while a developer is making changes and then releasing the application for another developer to make changes. Certain applications can be designated as being not publicly modifiable.

In various examples, the developer application 212 can support the generation of aggregated or consolidated applications. In an example, where multiple entities have acted on the same object, an aggregated application can be generated. (e.g., "X and Y have commented on Z's update.") In an example, where an entity has acted on multiple objects, an aggregated application can be generated. (e.g., "A has joined B and C.") In an example, where an entity has performed multiple actions, a single collapsible and expandable update can be generated. (e.g., "K has commented on L's update," "K is now connected to M," and "K read N's article" can be consolidated to "K has commented on L's update. (+ show more from K)") The unified social content platform 110 can be based on indexed search criteria that can return, for instance, all of the activities of a particular entity over a predetermined time period. The unified social content platform 110 can periodically search for entities and objects in the search index to identify pertinent information that can support aggregated or consolidated actions.

Figure 5:
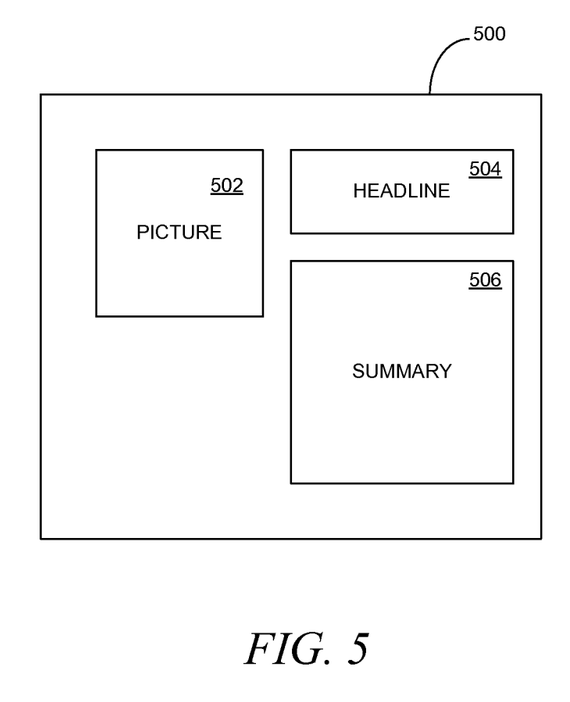
FIG. 5 is an activity rendering screen as can be displayed by a unified social content program.

FIG. 5 is an activity rendering screen 500 as can be displayed by the unified social content program 100, such as by the developer application 212. A developer can utilize the activity rendering screen 500 to develop a model to render an activity with common rich text, images, and so forth, as compared to other activities. The activity rendering screen 500 includes a picture field 502, a headline field 504, and a summary field 506. In various examples, a developer can choose to omit various fields 502, 504, 506.

The model can form the basis for rendering by providing instructions to the client-side, such as the user device 102. The client-side can utilize the model to render the activity. Based on changes promulgated to the client side, upon an updated standard for rendering the model, the rendering itself may be changed and updated without having to change the model or the activity itself.

The unified social content platform 110 can provide multiple models. The number of models may be limited in order to prevent undesired lack of uniformity. However, the number of models may be selectable to permit desired flexibility. Various models can include a basic model that includes one each of the picture field 502, the headline field 504, and the summary field 506. An additional model can include a gallery view that includes multiple picture fields 502 and, in various examples, no summary field 506. A list view model can include an expanded summary field 506, such as includes a bulleted list, and that optionally does not include a picture field 502.

In an example, a developer can chose from among the pre-defined models. For each model, the developer an establish how to fill in each field 502, 504, 506, such as with specified images, bodies, verbs, objects, and so forth. The model can be stored in the electronic data storage 206 as a model schema. Each field can be assessed upon return of the model from the electronic data storage 206 for changes in the properties of the items that fill the fields 502, 504, 506.

To conduct rendering, the client-side, such as the client device 102, can be provided with a parser function to transform the body into an appropriate format based on the context of the client device 102, such as whether the client device is a desktop computer, a mobile device, and so forth. The client device 102 can further be provided with a renderer function that can transform the model into the appropriate context. Based on the combination of the body and the model, the client device 102 can render the complete activity in the consistent format established throughout the application of the social network.

Figure 6:
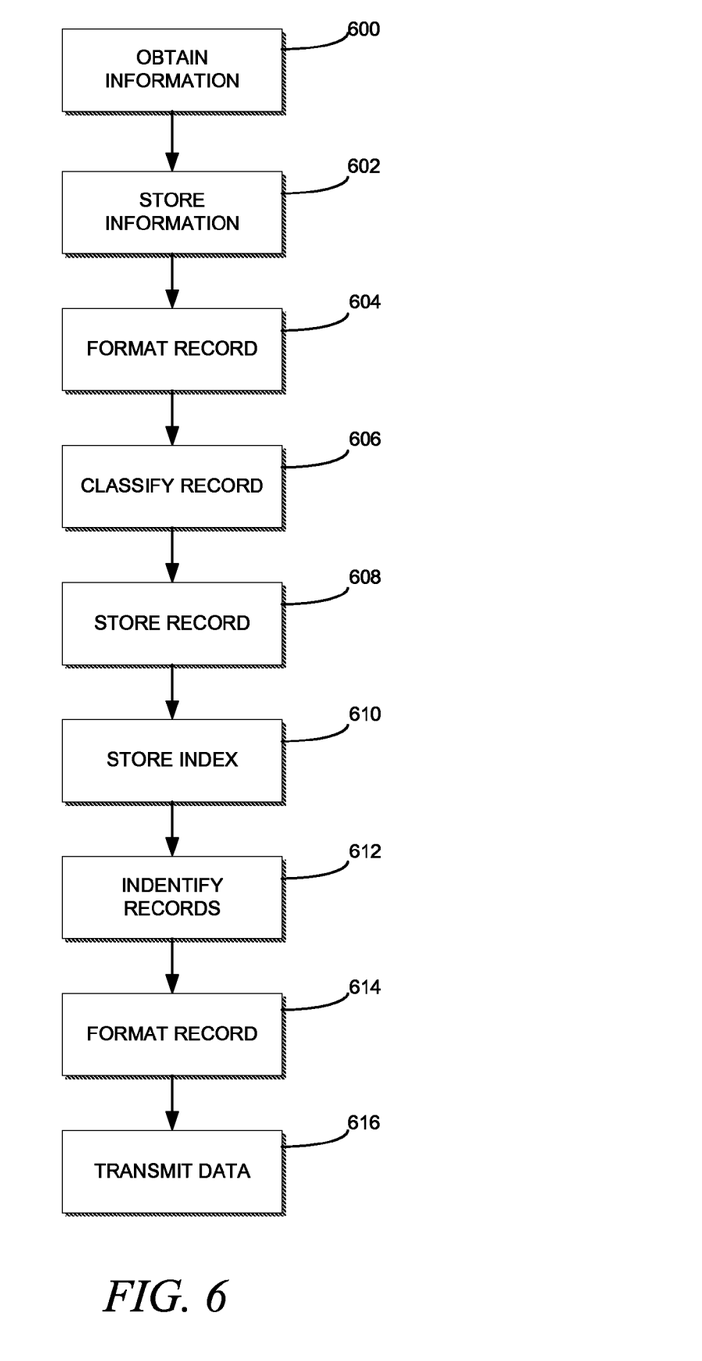
FIG. 6 is a flowchart for identifying information records in a social network database.

FIG. 6 is a flowchart for identifying information records 207 in a social network database 206. The flowchart can utilize the social networking system 100 or any other suitable system or device. In various examples, individual operations may be included or omitted as appropriate.

In operation 600, social network information is obtained from the social network. The social network information can include activities in or related to the social network and other information described herein.

In operation 602, the social network information is stored in the electronic data storage 206, such as an information record 207. The information record 207 can include the user associated with the social network information and the at least one of the application and the object associated with the social network information. In an example, each information record 207 is associated with an individual one of the applications, with at least one of the applications generating social network information in a format that is incompatible with a format of other ones of the applications.

In operation 604, the social network information is formatted and stored in the electronic data storage 206A as an electronic data record 207. The format can be a common format among all of the electronic data records 207.

In operation 606, individual social network information records 207 are classified according to the related user of the social network and at least one of the application that generated the individual information record 207 and an object of the individual information record 207. The object of the information record 207 can be the object displayed in the object field 308. In various examples, the information record 207 is classified according to individual ones of the body fields 304, 306, 308, 310.

In operation 608, social network information records 207, as classified, are stored in a social network database 206. In various examples, the social network information records 207 as classified are stored in information record storage 206A, as part of the index 206B (below), or both.

In operation 610, the electronic data index 206B is stored based on the information records 207 as classified.

In operation 612, ones of the information records 207 as classified in the social network database 206 are identified based on at least one of the associated user and at least one of the associated application and the associated object. In various examples, the information records 207 may be identified according to individual ones of the body fields 304, 306, 308, 310.

In operation 614, the information record 207, such as is identified in operation 612, is formatted with an essentially equivalent one of the actor, the verb, the object, and the attributed entity according to a common format based on the one of the actor, the verb, the object, and the attributed entity, such as can be included in the body fields 304, 306, 308, 310. Formatting the information record 207 can be to place the information record in the format of the body 302, such as according to a rendering template. Formatting the information record 207 can be in a plurality of languages.

In operation 616, information indicative of the information record 207 is transmitted to the social network. In various examples, the information indicative of the information record 207 is in the format of the body 302.

Figure 7:
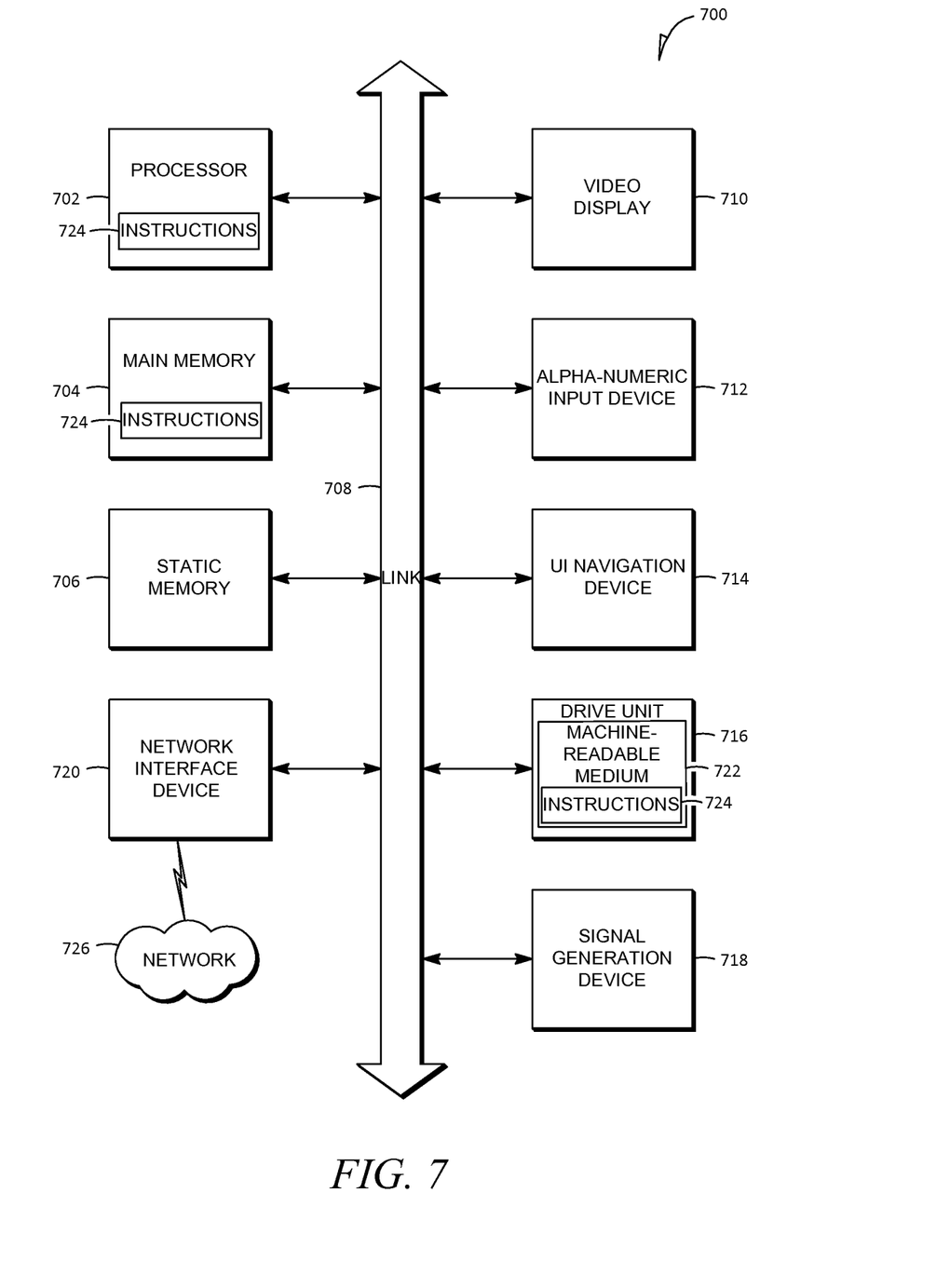
FIG. 7 is a block diagram illustrating components of a machine able to read instructions from a machine-readable medium.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 6 shows a diagrammatic representation of the machine 700 in the example form of a computer system and within which instructions 724 (e.g., software) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
    an electronic data storage, configured to store a social network database; and
    a processor, configured to:
        cause a user interface to present, and receive an input from, a developer application, the developer application including an application creation frame, wherein the application creation frame includes, for a subject application, a name field for a name of the subject application, a namespace field for a namespace of the subject application, and a description field for a description of the subject application;
        receive social network information related to social network activities from a plurality of published social network applications;
        generate social network information records for the activities, each social network information record classifying the individual ones of the activities according to:
            an actor, a verb, an object, and an attributed entity;
            a user of the social network related to the activity; and
            an associated one of the plurality of published social network applications according to the name of a corresponding subject application, the namespace of the corresponding subject application, and the description field of the corresponding subject application;
        store the social network information records in a social network database;

identify, from the social network database, ones of the information records as classified based on at least one of the user and the application; and publish the ones of the information records as identified according to a common format, the common format including:

an actor field, a verb field, an object field, and an attributed entity field configured to display information indicative of the actor, the verb according to a conjugation and a property of a corresponding subject verb, the object according to a preposition and a type of a corresponding subject object, and the attributed entity, respectively; and organized according to a sentence structure.

2. The system of claim 1, wherein individual ones of the social network information records correspond to individual ones of a plurality of applications, at least one of the applications configured to generate social network information in a format that is incompatible with a format of other ones of the applications; and wherein the processor is configured to store the social network information records in a common format.

3. The system of claim 1, wherein the social network information includes words indicative of the actor, the verb, the object, and the attributed entity, and wherein the social network information records include the words in fields individually associated with the actor, verb, the object, and the attributed entity.

4. The system of claim 1, wherein the social network database is further configured to store an electronic data index based on the individual information records as generated.

5. The system of claim 4, wherein the processor is further configured to identify ones of the information records based on the electronic data index.

6. The system of claim 4, wherein the electronic data index does not include the individual information records.

7. The system of claim 1, wherein the processor is configured to further format individual information records in a plurality of languages based on the actor, the verb, the object, and the attributed entity.

8. The system of claim 1, wherein the processor is configured to cause the user interface to display the developer application including a query frame, wherein the query frame includes, for a subject feed, a browsing query language field to specify a browsing query language of the subject feed and an attribute field to specify an attribute of the subject feed;

wherein the processor is configured to generate the social network information records by classifying the associated one of the plurality of published social network applications according to the browsing query language of a corresponding subject feed, and the attribute field of the corresponding subject feed.

9. A memory device, the memory device communicatively coupled to a processor and comprising instructions which, when performed on the processor, cause the processor to perform operations comprising:

causing a user interface to present, and receive an input from, a developer application, the developer application including an application creation frame, wherein the application creation frame includes, for a subject application, a name field for a name of the subject application, a namespace field for a namespace of the subject application, and a description field for a description of the subject application;

generate social network information records, each social network information record classifying the individual ones of the activities related to a user of the social network according to:

an actor, a verb, an object, and an attributed entity;

a user of the social network related to the activity; and an associated one of the plurality of published social network applications according to the name of a corresponding subject application, the namespace of the corresponding subject application, and the description field of the corresponding subject application; and store the social network information records in a social network database;

identify, from the social network database, ones of the information records as classified in the social network database based on at least one of the user and the application; and publish the ones of the information records as identified according to a common format, the common format including:

an actor field, a verb field, an object field, and an attributed entity field configured to display information indicative of the actor, the verb according to a conjugation and a property of a corresponding subject verb, the object according to a preposition and a type of a corresponding subject object, and the attributed entity, respectively; and organized according to a sentence structure.

10. The memory device of claim 9, wherein individual ones of the social network information records correspond to individual ones of a plurality of applications, at least one of the applications configured to generate social network information in a format that is incompatible with a format of other ones of the applications, and wherein the memory device further comprises instructions that further cause the processor to store the social network information records in a common format.

11. The memory device of claim 9, wherein the social network information includes words indicative of the actor, the verb, the object, and the attributed entity, and wherein the social network information records include the words in fields individually associated with the actor, verb, the object, and the attributed entity.

12. The memory device of claim 9, wherein the memory device further comprises instructions that further cause the processor to store an electronic data index based on the individual information records as generated.

13. The memory device of claim 12, wherein the memory device further comprises instructions that further cause the processor to identify ones of the information records based on the electronic data index.

14. The memory device of claim 12, wherein the electronic data index does not include the individual information records.

15. The memory device of claim 9, wherein the memory device further comprises instructions that further cause the processor to further format individual information records in a plurality of languages based on the actor, the verb, the object, and the attributed entity.

16. The memory device of claim 9, wherein causing the user interface to display the developer application further comprises displaying a query frame, wherein the query frame includes, for a subject feed, a browsing query language field to specify a browsing query language of the subject feed and an attribute field to specify an attribute of the subject feed;

wherein generating the social network information records includes classifying the associated one of the plurality of published social network applications according to the browsing query language of a corresponding subject feed, and the attribute field of the corresponding subject feed.

17. A method, comprising:

causing, with a processor, a user interface to present, and receive an input from, a developer application, the developer application including an application creation frame, wherein the application creation frame includes, for a subject application, a name field for a name of the subject application, a namespace field for a namespace of the subject application, and a description field for a description of the subject application;

receiving, with a processor, social network information related to social network activities from a plurality of published social network applications;

generating social network information records, each social network information record classifying the individual ones of the activities according to:
- an actor, a verb, an object, and an attributed entity;
- a user of the social network related to activity; and
- an associated one of the plurality of published social network applications according to the name of a corresponding subject application, the namespace of the corresponding subject application, and the description field of the corresponding subject application; and storing the social network information records in a social network database;

identifying, from the social network database, ones of the information records as classified in the social network database based on at least one of the user and the application; and publishing the ones of the information records as identified according to a common format, the common format including:
- an actor field, a verb field, an object field, and an attributed entity field configured to display information indicative of the actor, the verb according to a conjugation and a property of a corresponding subject verb, the object according to a preposition and a type of a corresponding subject object, and the attributed entity, respectively; and
- organized according to a sentence structure.

18. The method of claim 17, wherein individual ones of the social network information records correspond to individual ones of a plurality of applications, at least one of the applications configured to generate social network information in a format that is incompatible with a format of other ones of the applications.

19. The method of claim 17, wherein generating the electronic data record includes formatting individual information records in a plurality of languages based on the actor, the verb, the object, and the attributed entity.

20. The method of claim 17, wherein causing the user interface to display the developer application further comprises displaying a query frame, wherein the query frame includes, for a subject feed, a browsing query language field to specify a browsing query language of the subject feed and an attribute field to specify an attribute of the subject feed;

wherein generating the social network information records includes classifying the associated one of the plurality of published social network applications according to the browsing query language of a corresponding subject feed, and the attribute field of the corresponding subject feed.

\* \* \* \* \*